July 27, 1954   A. F. ROMAN   2,684,608
LATHE TOOLHOLDER
Filed Sept. 27, 1951
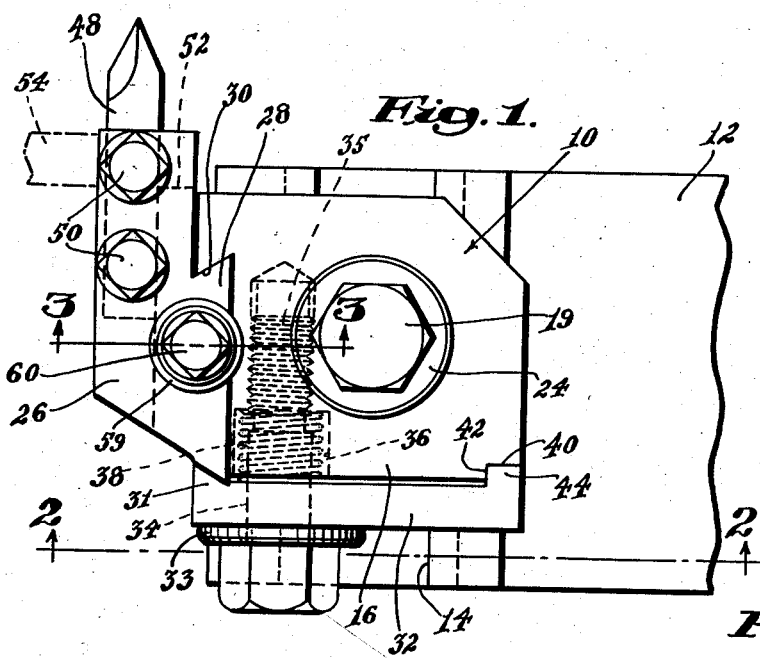
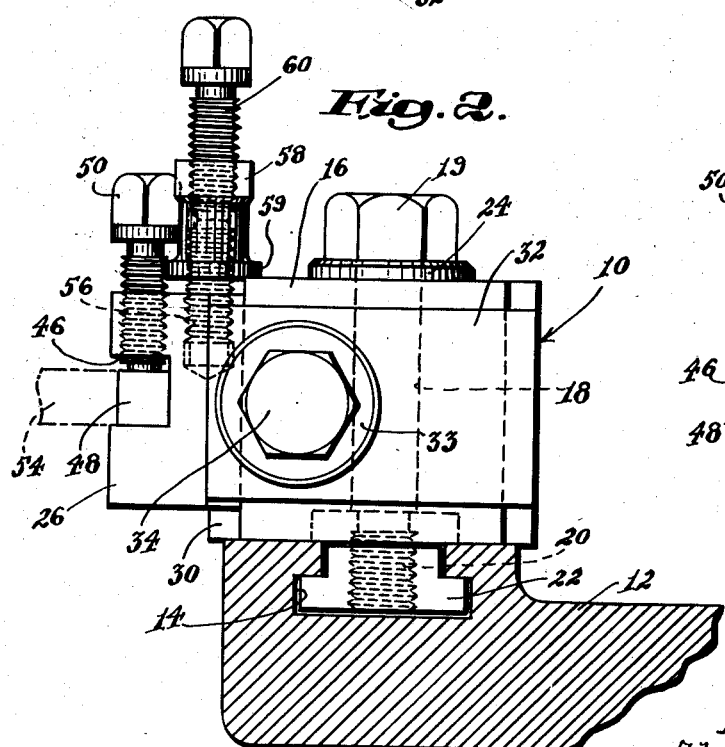
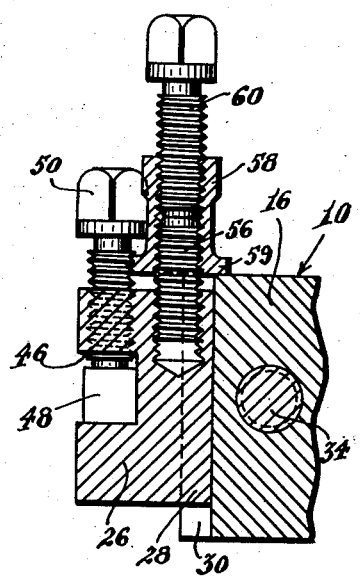
Inventor:
Aldo F. Roman
by John H. McKenna
Attorney Patented July 27, 1954

2,684,608

UNITED STATES PATENT OFFICE 2,684,608

LATHE TOOLHOLDER

Aldo F. Roman, East Boston, Mass.

Application September 27, 1951, Serial No. 248,532

2 Claims. (Cl. 82—36)

This invention relates to improvements in tool holders and more particularly to tool holders of the general type suitable for being mounted on the compound feed rest of a lathe, or the like, to hold a tool or bit in operative relation to work being processed in the lathe, or other comparable machine. The invention provides improvements whereby a tool or bit-holding clamp constitutes a separable and inter-changeable part of the tool holder and includes adjustable means for predetermining the position the point of a tool or bit held in the clamp will assume relative to the line of the lathe centers whenever the clamp is mounted for constituting a part of the tool holder.

When a number of duplicate work pieces are to be processed in succession in a lathe and each work piece is to be operated upon by two or more different cutters or bits, considerable time and labor have been expended in properly setting the respective cutters or bits following each replacement of one cutter or bit by the cutter or bit which is to perform the next succeeding operation on a work piece. It has been common practice for a lathe operator to spend substantially the same amount of time adjusting and setting cutters and bits for successive duplicate work pieces as is spent for adjustments and settings of the centers and bits for the initial one of the duplicate work pieces. Various proposals heretofore have been directed toward simplifying and speeding up the work when duplicate and multiple work pieces are to be processed. However, the prior lathe tool holders of which I am aware, and which have sought to reduce the labor and time involved in the machining of duplicate work pieces have been unduly complicated, and have not satisfactorily accomplished their intended purpose.

Hence, it is among the objects of the present invention to provide a lathe tool holder which greatly facilitates the procedure of machining duplicate work pieces, and which comprises relatively inexpensive and simple additions to the cross-feed slide of the conventional compound lathe rest. According to the invention a tool holder body is adjustably mounted on the conventional cross-feed slide, and a tool or bit clamp is adjustably and removably mounted in the tool holder body, with adjustable means for coaction with the body whereby an adjusted setting of a clamp in said body to accurately locate the tool or bit in a predetermined relation to work in the lathe or to the centers of the lathe, may be automatically repeated each time that clamp is mounted in the tool holder body without any subsequent adjustments.

Another object of the invention is to provide a lathe tool holder wherein a tool-carrying clamp is removably mounted in a tool holder body with means for clamping it in any of numerous positions in said body, and with adjustable means thereon for automatically predetermining the position of the tool or bit when the clamp is removed and subsequently is put back in said body.

A further object of the invention is to provide a lathe tool holder wherein a tool holder body is adjustable along a conventional cross-feed slide and is angularly adjustable around the vertical axis of said body, and wherein a tool-carrying clamp is removably mounted in said body, with adjustable means on the clamp whereby the clamp automatically assumes the same position relative to the axis of the lathe centers each time the clamp is mounted in said tool holder body.

It is, moreover, my purpose and object generally to improve the structure and operative efficiency of tool holders and more especially lathe tool holders having provision for facilitating and simplifying procedures when duplicate work pieces are to be processed in a lathe, or a comparable machine tool.

In the accompanying drawing:

Fig. 1 is a top plan view of a tool holder embodying features of the invention, it being shown mounted on the conventional cross-feed slide of a compound rest of a lathe;

Fig. 2 is a cross-sectional view through the cross-feed slide on line 2—2 of Fig. 1, the tool holder being shown in side elevation; and Fig. 3 is a cross-sectional view approximately on line 3—3 of Fig. 1.

Referring to the drawing, the tool holder is indicated generally at 10 and a portion of the cross-feed slide of a compound lathe rest is represented at 12, having the conventional T-slot 14 therein.

The tool holder 10 comprises a generally rectangular body part 16 through which the clamping bolt 18 loosely extends, with its lower end threaded at 20 and screwed into a nut 22 which is non-rotatably engaged in the T-slot 14. Preferably, a washer 24 intervenes between the head 19 of the bolt and the top surface of the body part 16 and the latter may be adjusted along the T-slot 14 and adjusted angularly around the axis of the bolt 18 when the bolt is loosened, after which tightening of the bolt effects a secure clamping of the body part 16 in any selected position of the body part 16 on the slide 12.

A tool-holding or bit-holding clamp 26 is mounted for vertical adjustment at the inner face of the body part 16, it being dove-tailed at 28 for engaging in a complementary vertically extending way 30 in the body part 16. Securement of the clamp 26 in any selected position along the vertical way 30 is accomplished by forming one of the V-shaped side walls 31 of the way 30 on a separate plate part 32 of the tool holder 10, and this plate part 32 is held on one side of body part 16 by the clamping bolt 34 which extends loosely through plate part 32 with its threaded end 35 screwed into the body part 16. Preferably, a washer 33 intervenes between the head of bolt 34 and the plate part 32. A feature is that a recess 36 is formed in the body part 16 adjacent to plate part 32, and a spring 38 is arranged around bolt 34 within recess 36 and constantly urges the plate part 32 outwardly in direction away from body part 16. Hence, when bolt 34 is tightened, spring 38 is compressed and the V-shaped side wall 31 of way 30 is drawn into clamping relation to the dove tail 28 of clamp 26 in the way 30 thereby to secure the clamp 26 in any selected position along way 30. Loosening of bolt 34 results in plate part 32 being forced outward by spring 38 with a corresponding outward movement of the V-shaped side wall 31 of way 30, which frees clamp 26 for movement in way 30, including removal or insertion of the clamp or substitution of one clamp for another in the vertical way 30. Actually the plate part 32 needs to move relatively little between its clamping and releasing positions, but it is desirable to maintain it at all times with the V-shaped side wall 31 of way 30 properly aligned with the opposite V-shaped side wall of way 30. This simply may be accomplished by the vertical cut-out at 40 in body part 16 which provides a guide shoulder at 42 for coaction with a projection 44 on plate part 32.

The tool or bit clamp 26 is shown notched at 46 for reception of a cutting tool or bit 48 which may be secured in the clamp 26 by one or more set screws 50. The clamp also may be notched transversely of the notch 46, as at 52, for reception of a drill 54, or other tool which it may be desired to mount with projection at right angles to the illustrated position of the cutting tool or bit 48, one of the illustrated two set-screws 50 being in position to engage a tool inserted in the notch 52.

According to the invention, the clamp 26 is equipped with means coacting with body part 16 whereby, after having been set to properly position the tool or bit 48 relative to work in a lathe, or relative to the centers of the lathe, the clamp may be removed from the tool holder 10 and later be put back with assurance that its tool or bit 48 automatically will assume precisely the setting which it initially had in the tool holder body part 16.

As best seen in Fig. 3, a threaded stud 56 is fixed in clamp 26 and has substantial vertical threaded projection above the top surface of the clamp centrally of the dove tail 28. A finger nut or sleeve 58 is screwed on the fixed stud 56 and has a base portion 59 of size for engaging the top margin of body part 16 for constituting a stop limiting downward movement of clamp 26 in vertical way 30. Manual adjustments of finger nut or sleeve 58 on the fixed stud 56 will raise or lower the tool or bit 48 relative to the plane of the top surface of body part 16, and the nut or sleeve 58 may be locked in any selected position of adjustment on stud 56 by the lock screw 60 which screws into the upper end of nut or sleeve 58 into engagement with the upper end of stud 56. The clamping bolt 34, of course, will be loosened during adjustments of the finger nut or sleeve 58 to leave the clamp 26 free to move in way 30. After locking nut or sleeve 58 in a selected position on stud 56, the clamping bolt 34 will be tightened to secure the clamp against movement in either direction along way 30.

The invention contemplates that a plurality or a series of identical tool-holding or bit-holding clamps 26 will be available for interchangeable use in a body part 16 of the improved tool holder. Hence, when a number of similar work pieces are to be produced, each requiring work to be done on it by two or more different cutters or tools, each cutter or tool may be mounted in its individual clamp 26 and, during the machining of the first work piece, each clamp 26 will be properly set, by adjusting finger nut or sleeve 58, for positioning its cutter or tool accurately for the particular operation it is to perform on the work pieces. After the cutter or tool in any particular clamp 26 has performed its work on the first work piece, the clamp may be removed and another clamp put in place. When the various operations have been performed on the first work piece, the finger nut or sleeve 58 of each clamp 26 will have been properly set so that, as each clamp is put back in body part 16 of the tool holder, its cutter or tool will assume the identical position therein that it had originally and its operation on the second and subsequent work pieces may be performed without loss of time to properly set it. Each clamp 26 needs only to be inserted in way 30 until its locked finger nut or sleeve 38 engages the top margin of body part 16, following which a tightening of clamping bolt 34 will secure the clamp with assurance that its cutter or bit will be at the precise proper setting for the operation it is to perform on the work pieces.

The invention makes it possible to greatly speed production of duplicate work pieces as compared to what has been possible with the prior comparable lathe tool holders of which I am aware. After the machining operations on the first work piece have been completed, the similar operations on each subsequent duplicate work piece may be accomplished in a fraction of the time required for the first work piece.

It will be obvious that any of numerous varieties of cutters, tools or bits may be mounted in the tool-holding clamp 26 and may be variously set relative to work which is to be operated upon. For example, in addition to the permitted vertical adjustments of the clamp, the body part 16 of the tool holder may be adjusted angularly around the axis of its clamping bolt 18 to set the tool or bit in any of various angular relations to the work.

It is intended that the patent shall cover, by suitable expression in the appended claims, whatever features of patentable novelty exist in the invention disclosed.

I claim as my invention:

1. In a lathe tool holder having a body adapted to be mounted on the conventional cross-slide of a compound lathe rest and having a bit clamp removably mounted on said body and adjustable vertically relative to said body, said body having therein a vertical dove-tail groove, and said bit clamp having a complementary dove-tail slide portion mounted in said groove in the body, a threaded stud fixed on said bit clamp and projecting vertically upward from an upper surface thereof relatively close to the vertical plane of the bottom of said groove in the body at the bit clamp side of said plane, a relatively long finger nut screwed on said stud and having a base portion for engaging an upper surface of said body, adjacent to the said plane of the bottom of said groove in the body, when said bit clamp moves downward in said groove in the body, whereby said nut limits the downward movement of said bit clamp, said nut being manually adjustable along said vertical stud to stop the downward movement of said bit clamp with the bit clamp in any of various positions along the vertical groove in said body including positions in which the top of said bit clamp may be substantially below the said upper surface of the body, and a locking screw threaded axially into the upper end of said screw and adapted to be screwed within said nut into engagement with the upper end of said stud thereby to lock the said nut in any selected position of adjustment along said vertical stud.

2. In a lathe tool holder having a body adapted to be mounted on the conventional cross-slide of a compound lathe rest and having a bit clamp removably mounted on said body and adjustable vertically relative to said body, means providing a vertical dove-tail groove in said body for reception therein of a complementary dove-tail slide portion of said bit clamp, said means including a plate element having thereon one side wall of said groove, a threaded stud fixed on said bit clamp and projecting vertically upward from an upper surface thereof relatively close to the vertical plane of the bottom of said groove in the body at the bit clamp side of said plane, a relatively long finger nut screwed on said stud and having a base portion for engaging an upper surface of said body, adjacent to the said plane of the bottom of said groove in the body, when said bit clamp moves downward in said groove in the body, whereby said nut limits the downward movement of said bit clamp, said nut being manually adjustable along said vertical stud to stop said bit clamp in any of various positions along said groove in the body including positions in which the top of said bit clamp may be substantially below said upper surface of the body, a locking screw threaded axially into said nut and adapted to be screwed within said nut into engagement with the upper end of said stud thereby to lock the said nut in any selected position of adjustment along said vertical stud, a clamping screw extending loosely through said plate element and threaded into said body whereby said plate may be drawn toward said body by means of the clamping screw to move the groove side wall which is on said plate into clamping engagement with said dove-tail slide portion of the bit clamp, and a spring constantly biasing said plate element in direction away from said body whereby said plate element is moved away from said body automatically in response to loosening of said clamping screw thereby to release said dove-tail slide portion of the bit clamp.

References Cited in the file of this patent

UNITED STATES PATENTS

| Number | Name | Date |
|---|---|---|
| 2,466,596 | Krause | Apr. 5, 1949 |
| 2,571,530 | Brekke | Oct. 16, 1951 |

FOREIGN PATENTS

| Number | Country | Date |
|---|---|---|
| 226,270 | Switzerland | June 16, 1943 |
| 239,581 | Switzerland | Feb. 1, 1946 |
| 830,879 | France | May 23, 1938 |